Oct. 3, 1950          W. J. ZEHR          2,524,584

METHOD OF FORMING CONTAINERS

Filed Oct. 18, 1949

Inventor
William J. Zehr
By:-
Cromwell, Greist & Warden
Attys.

UNITED STATES PATENT OFFICE 2,524,584

METHOD OF FORMING CONTAINERS

William J. Zehr, Mount Vernon, Ohio, assignor to Shellmar Products Corporation, Chicago, Ill., a corporation of Delaware Application October 18, 1949, Serial No. 121,960

6 Claims. (Cl. 154—116)

This invention relates to containers and is particularly concerned with improvements in the formation of a series of tubular containers in connected relation.

It is an object of the invention to provide an improved method and means for fabricating from a length of tubular stock of flexible heat-sealable material a series of connected containers wherein the stock material is heat sealed transversely at spaced points.

It is a more specific object of the invention to provide a method and means for fabricating containers wherein a continuous length of the stock material is folded along transverse lines which are spaced the desired container length lengthwise of the stock and the successive folds are subjected to radiant heating for a sufficient length of time to fuse the material adjacent the folds and form integral seams transversely of the stock.

It is a further object of the invention to provide a method and means for fabricating a series of connected flattened tubular containers by providing longitudinally spaced transverse seams in a continuous length of tubular material, wherein a small section of the flattened tubular stock is doubled or folded between a pair of clamping jaws which engage the material on opposite sides and in predetermined spaced relation to the fold line thereof, and thereafter the folded and clamped material is moved into juxtaposed relation to a radiant heating unit for a sufficient length of time to melt the small section of the material extending beyond the clamping jaws whereby to form a bead-like transverse seam across the width of the flattened tubular stock.

These and other objects and advantages will be apparent from a consideration of the embodiment of the invention which is shown by way of illustration in the accompanying drawings, wherein.

Figure 1:
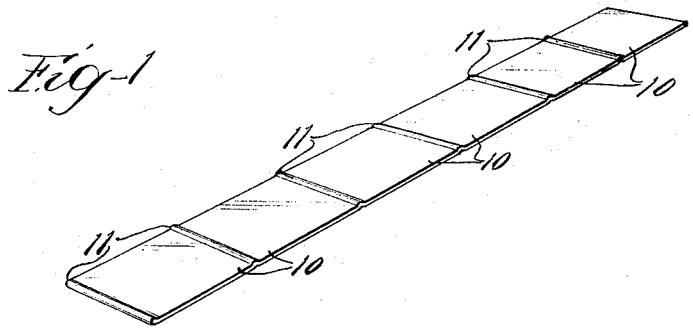
Fig. 1 is a perspective view of a plurality of flattened tubular connected containers formed in accordance with the principles of the invention.

Referring to Fig. 1 of the drawings, there is illustrated a series of connected containers which are formed in accordance with the principles of the invention from a continuous length of seamless tubular heat-sealable material in a flattened condition. The connected containers 10 are each separated from the adjoining container by transverse seal formations 11 which are formed at spaced intervals along the length of the stock material. Preferably the stock material is a flattend seamless tube of polyethylene film or similar material having like heat sealing characteristics.

Figure 2:
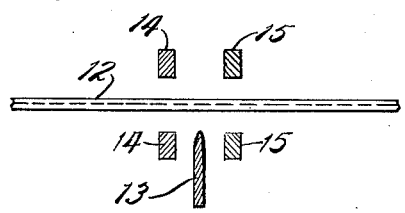
Figs. 2, 3, 4 and 5 are side elevations illustrating the steps involved in the fabrication of the containers shown in Fig. 1 with the apparatus being shown schematically.
Figure 3:
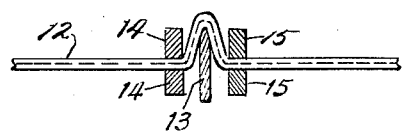

In the fabrication of the containers 10 a continuous length of seamless tubular material 12 (Fig. 2) is arranged to move between a lower folding blade 13 and pairs of clamping members 14 and 15 which are arranged on the opposite sides of the path of travel of the material and which are initially positioned in spaced relation to each other and to the adjacent surface of the material.

Figure 4:
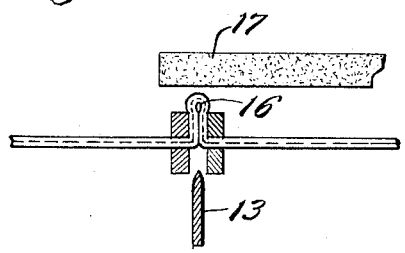
Figure 5:
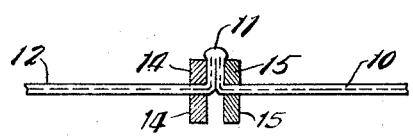

The folding blade 13 is mounted on an appropriate reciprocating support so that it may be moved upwardly against the material 12 and between the clamping members 14 and 15 which are also mounted on reciprocating supports for simultaneous movement into engagement with the surfaces of the material 12. The blade 13 is moved a sufficient distance between the clamping members 14 and 15 to position in double folded relation a predetermined portion of the material 12 so that a small portion of the material on each side of the fold line 16 extends beyond the upper faces of the upper clamping elements 14 and 15 (Fig. 4). The projecting portion of the material adjacent the fold line 16 is then subjected to radiant heat by moving relative thereto a fixed heating bar 17 for a sufficient length of time for the exposed portion of the web material to melt and form a transverse bead-like seal formation 11 (Fig. 5).

Figure 6:
Fig. 6 is a side or edge elevation of portions of two of the connected containers showing the transverse seam.

The clamping bars 14 and 15 are preferably cooled to a temperature below that of the material to prevent the melting of the material below the upper faces of the bars so that the melted portion of the material is confined to a relatively small area. When the melted material cools it forms a bead formation and provides the transverse seal 11 which projects slightly above the surface of the adjacent portions of the containers when the tubular material is straightened out as shown in Figs. 1 and 6.

The containers 10 may be separated after the seals are completed by cutting adjacent each seal 11 to provide individual containers, or a plurality of the connected containers 10 may be wound into a roll or folded in any other manner into compact relation for storage and shipment to the user.

The tubular stock material need not be seamless tubing but may have a longitudinal seam formed in any conventional manner or such seam may be formed by fusing the material in the same manner as in providing the transverse seam.

While the method of container forming which constitutes the invention as herein disclosed is illustrated in connection with particular materials, it is contemplated that other materials may be employed within the spirit of the invention.

I claim:

1. A method of forming a connected series of containers which comprises feeding a continuous length of flattened tubular stock of relatively flexible heat-sealable material in a predetermined path, forming at spaced intervals along the tubular stock transverse folds, subjecting successive folds to radiant heat for a sufficient length of time to melt the material at the folds, and thereafter permitting the melted material to set in a bead-like seam formation.

2. A method of forming a series of connected containers from a length of flattened tubular material which tubular material is characterized by its ability to melt when subjected to radiant heat for a predetermined length of time and to form a bead when cooled which method comprises folding the flattened tubular material along transverse lines at longitudinally spaced intervals, and subjecting the folded portions of the same to radiant heat while restricting the heat to a relatively narrow area transversely of the material, the material being subjected to the heat until it melts and then removed from the heat to form a bead-like seam along said restricted area.

3. A method of forming a connected series of containers which comprises feeding a continuous length of tubular stock of relatively thin polyethylene material, forming at spaced intervals along the stock relatively narrow transverse folds, subjecting successive folds to radiant heat for a sufficient length of time to melt the material at the folds, and thereafter cooling the melted material to provide a bead-like seam formation.

4. A method of forming a series of connected containers from a length of flattened tubular material which material is characterized by its ability to melt when subjected to radiant heat for a predetermined length of time and when cooled to form into a bead-like seam which method comprises folding relatively narrow portions of the material along transverse lines at longitudinally spaced intervals, engaging the material adjacent the folds with cooling elements, subjecting the folded portions of the material which extend beyond the cooling elements to radiant heat until it melts, and thereafter permitting the melted material to cool and form a bead-like seal.

5. A method of forming a series of connected containers from a length of flattened tubular polyethylene material which comprises doubling the material upon itself along transverse lines at longitudinally spaced intervals and subjecting the end of the doubled portions of the material to radiant heat while restricting the heat to a relatively narrow end area, the material being subjected to the heat until it melts and thereafter allowing the melted material to cool and form a bead-like seam along said restricted area.

6. A method of forming a connected series of containers which comprises feeding a length of tubular stock of relatively flexible heat-sealable material transversely of a pair of spaced clamping elements, moving a portion of the material between the clamping elements to form a transverse fold, moving the clamping elements together to grip the folded material between the same with the end portion of the fold extending beyond the same, subjecting the end portion of the fold to radiant heat for a sufficient length of time to melt the extending material, and thereafter permitting the melted material to set and form a bead-like seam.

WILLIAM J. ZEHR.

REFERENCES CITED

The following references are of record in the file of this patent:

UNITED STATES PATENTS

| Number | Name | Date |
|---|---|---|
| 2,266,459 | Gilbert | Dec. 16, 1941 |
| 2,289,618 | Young | July 14, 1942 |
| 2,488,212 | Lloyd, Jr. | Nov. 15, 1949 |
| 2,494,905 | Shumann | Jan. 17, 1950 |